Sept. 5, 1967     E. L. ANDERSON     3,339,913
ACCESSORY CLAMPING STRUCTURE FOR SURGICAL TABLES
Filed Oct. 8, 1963     8 Sheets-Sheet 1

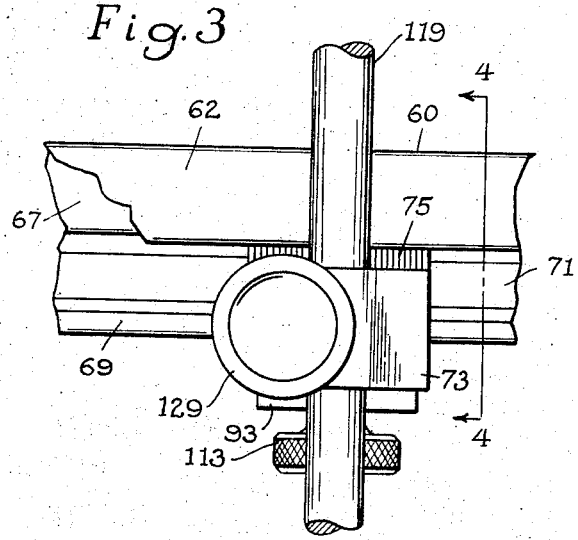
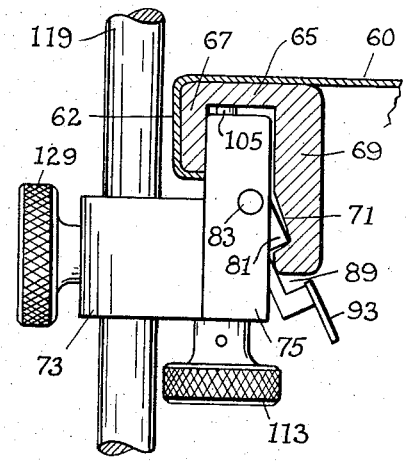
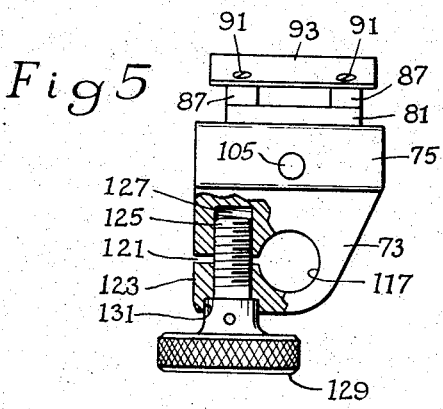
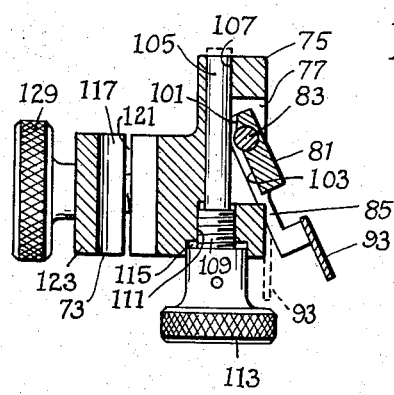
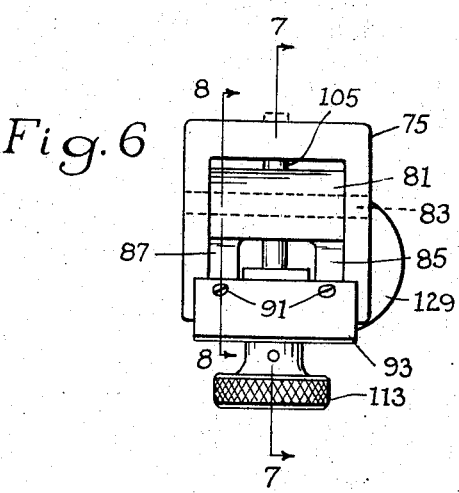
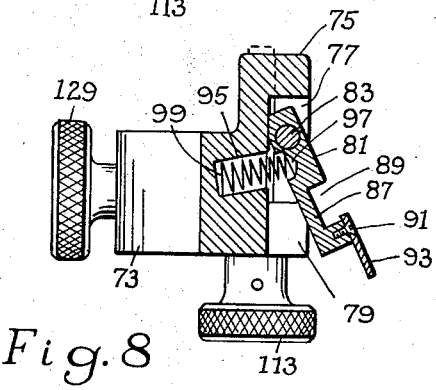

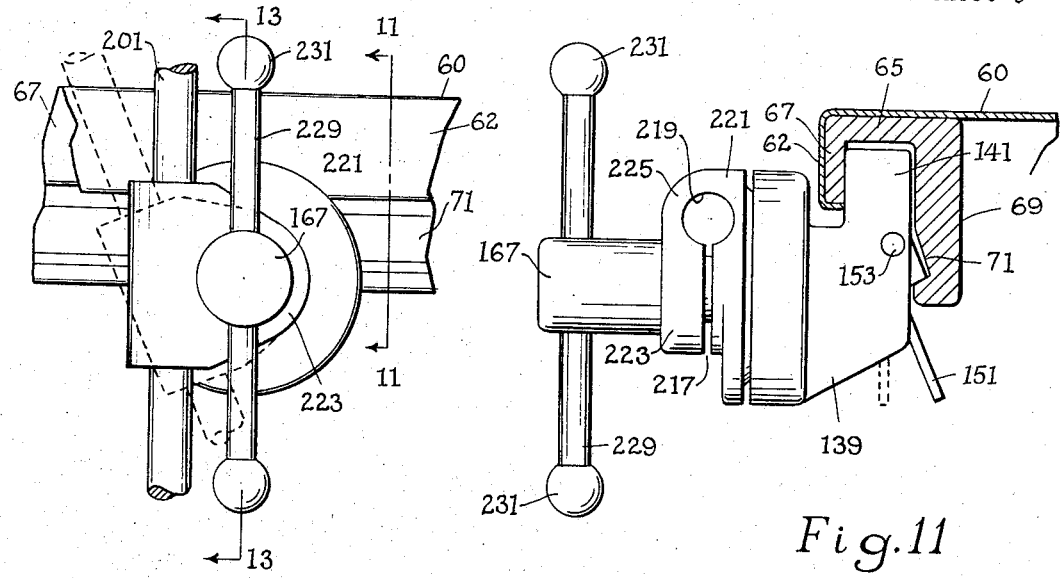
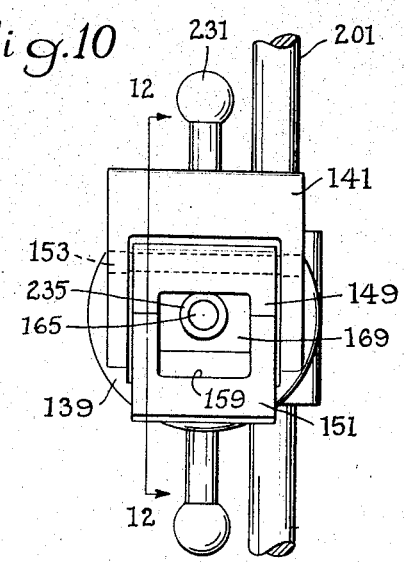
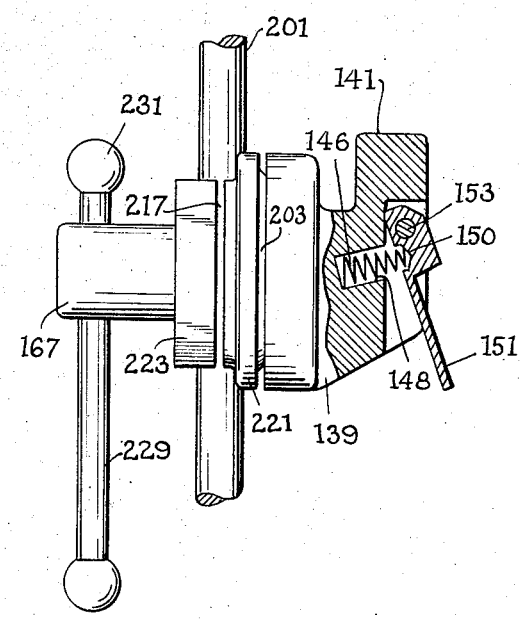

Sept. 5, 1967         E. L. ANDERSON         3,339,913
ACCESSORY CLAMPING STRUCTURE FOR SURGICAL TABLES
Filed Oct. 8, 1963         8 Sheets-Sheet 4

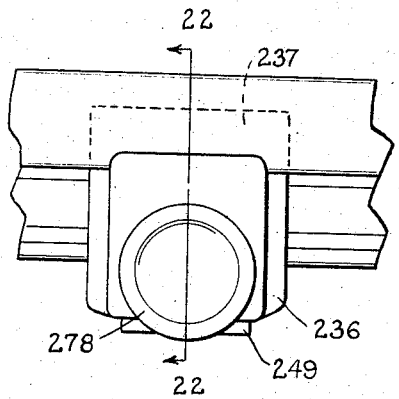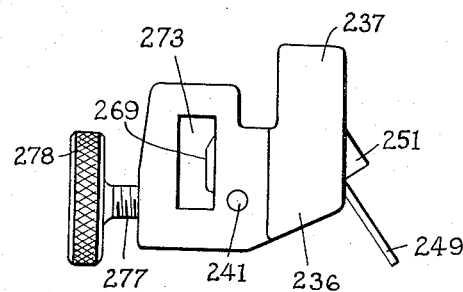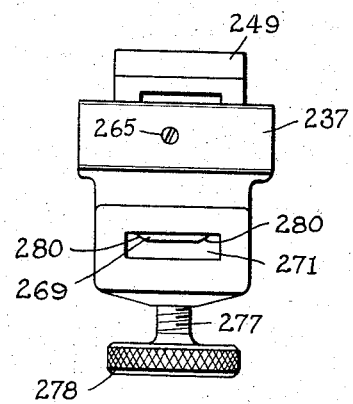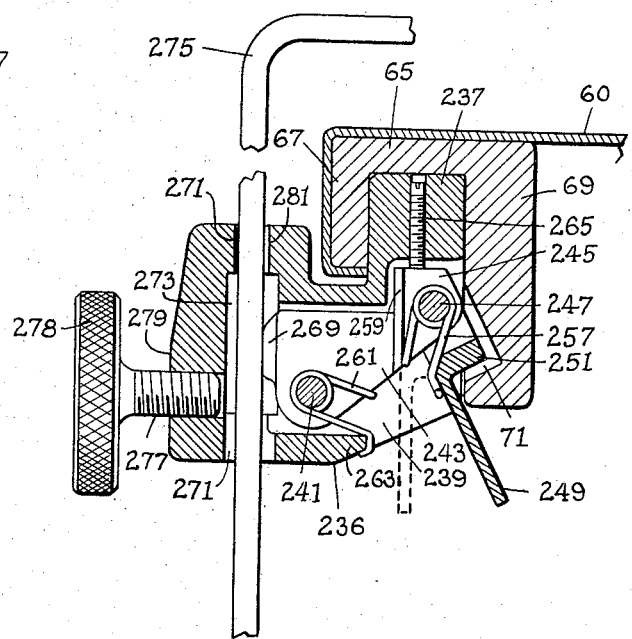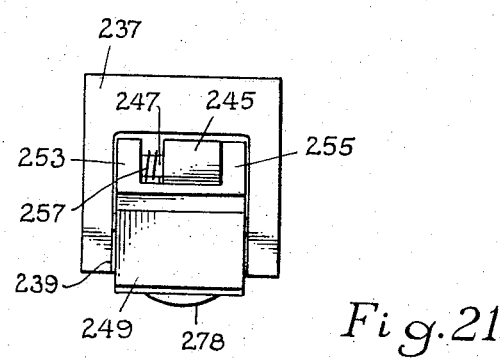

United States Patent Office 3,339,913
Patented Sept. 5, 1967

3,339,913
ACCESSORY CLAMPING STRUCTURE FOR SURGICAL TABLES
Edgar L. Anderson, Penfield, N.Y., assignor, by mesne assignments, to Ritter Pfaudler Corporation, a corporation of New York
Filed Oct. 8, 1963, Ser. No. 314,804
18 Claims. (Cl. 269—328)

This invention relates to an accessory attaching clamp adapted for supporting various accessories from the side bars or rails of a surgical operating table, or the like.

An object of the invention is to provide a generally improved and more satisfactory accessory attaching clamp for use on surgical operating tables, or the like.

Another object is the provision of an accessory clamp which may be applied to a surgical table side bar or rail directly at the desired location without any movement of the clamp longitudinally thereof.

Still another object of the invention is to provide an accessory clamp which automatically interlocks with the surgical table side bar and is adapted to be adjusted longitudinally thereof and fixed in a desired position.

A further object is the provision of a clamp which is adapted to support operating table accessories at various elevations and angular positions relative to the plane of a surgical table.

A still further object is to provide an accessory attaching clamp which can be easily and rapidly applied to and removed from the side rail of a surgical table with a minimum of movements and without the use of tools or special skills.

A still further object is to provide an accessory clamp which will neither obstruct the movements of the attending personnel nor prevent full utilization of the surgical table.

These and other desirable objects may be attained in the manner disclosed as an illustrative embodiment of the invention in the following description and in the accompanying drawings forming a part hereof, in which:

FIG. 3 is an enlarged front elevation of the clamp and a portion of the operating table and accessory shown in FIG. 1;

FIG. 4 is a vertical section taken through the operating table side rail approximately on the line 4—4 of FIG. 3;

FIG. 5 is a top plan of the clamp shown in FIG. 3, with parts being broken away and with the accessory being removed;

FIG. 6 is a rear elevation of the clamp shown in FIG. 3;

FIG. 7 is a central vertical section of the clamp taken approximately on the line 7—7 of FIG. 6;

FIG. 8 is a vertical section taken approximately on the line 8—8 of FIG. 6;

FIG. 9 is a front elevation of another embodiment of the invention shown secured to a surgical table side rail, shown in part;

FIG. 10 is a rear elevation of the clamp shown in FIG. 9;

FIG. 11 is a vertical section taken approximately on the line 11—11 of FIG. 9, showing the accessory supporting portion or clamp plate turned approximately 90° from its position in FIG. 9, and with the accessory being removed therefrom;

FIG. 12 is a partial vertical section taken approximately on the line 12—12 of FIG. 10;

FIG. 18 is a front elevation of still another embodiment of the invention secured to the side rail of an operating table, shown in part;

FIG. 19 is a right side elevation of the clamp shown in FIG. 18;

FIG. 20 is a top plan of the clamp shown in FIG. 18;

FIG. 21 is a rear elevation of the clamp shown in FIG. 18;

FIG. 22 is a central vertical section taken approximately on the line 22—22 of FIG. 18 showing an accessory applied thereto with the clamp in unlocked or released position;

The same reference numerals throughout the several views indicate the same parts.

In numerous surgical operations, medical examinations, and treatments, various accessories are employed for supporting different items of equipment on the surgical or examination table and for correctly orienting the patient's body in the most suitable position to provide maximum support or bracing of the body and to afford access to the desired area. The most practical and economical manner of supporting these accessories is by clamps secured to rails or bars extending longitudinally along both sides of the table top. In known constructions, it is common to have these side rails project laterally from the table top and serve the sole function of supporting accessory clamps. Further, the clamps of the prior constructions are usually threaded to the side rails, and thus have no adjustability, or must be engaged with one end of the side rail and moved longitudinally thereof to the desired location. It is obvious that such prior constructions not only restrict and obstruct the movements of the attending personnel but also require considerable time and complex operations in use.

In accordance with the present invention the objectional aspects of the prior constructions have been eliminated by providing improved side rails or bars, which are disposed beneath and form the structural framework of the table top, and by employing an accessory clamp construction which may be applied to the table side rail at any location along its length, is adjustable relative thereto, and can be fixed to the side rail by rapid and simple operations.

Figure 1:
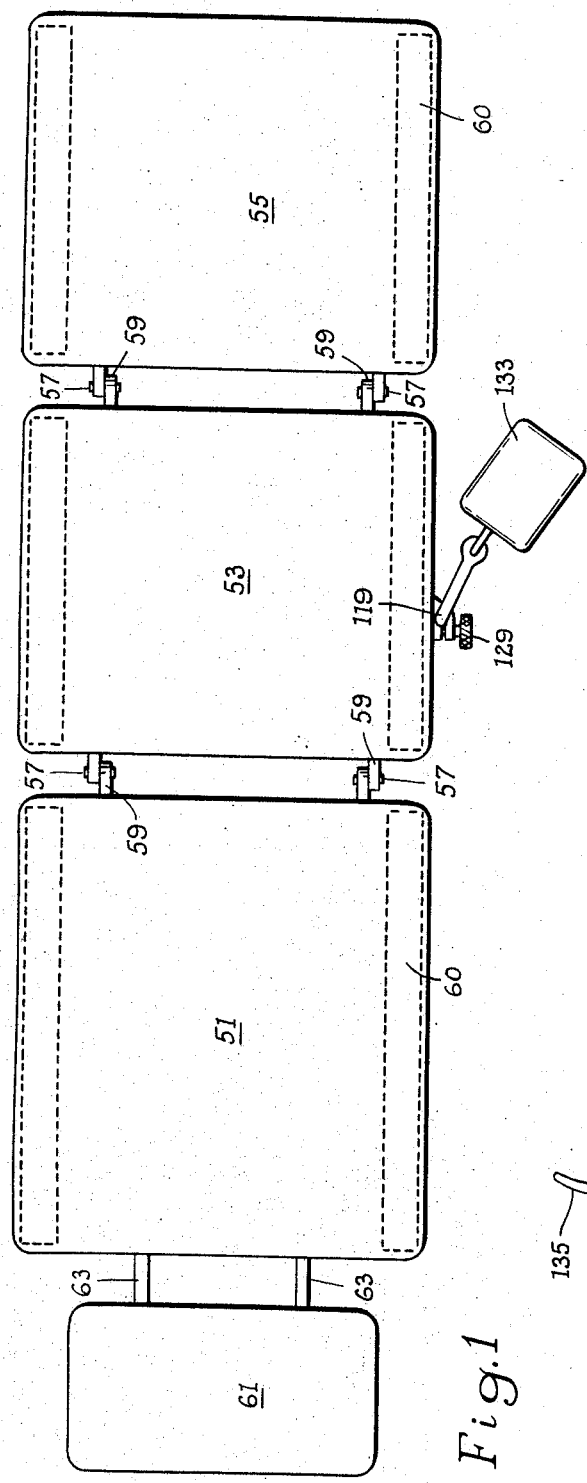
FIG. 1 is a top plan of a surgical table showing an accessory attached thereto by means of one embodiment of the present invention.
Figure 2:
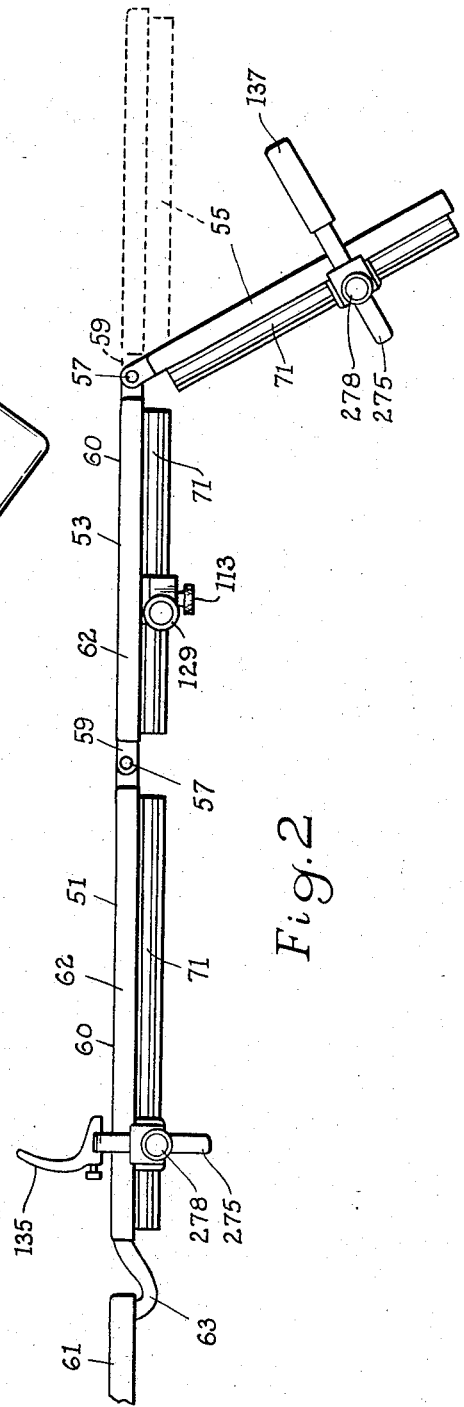
FIG. 2 is a partial side elevation of the operating table of FIG. 1 illustrating various other accessories attached thereto and showing the table foot section in adjusted angular position.

With reference to the drawings, FIGS. 1 and 2 schematically illustrate a surgical table top on which the clamp embodiments of the present invention are best suited for use. The table top is formed of a plurality of rectangular sections including back sections 51 and 53 and a leg rest 55, which are pivotally interconnected by pivot pins or rods 57 extending through alined apertures in the links 59, and a head rest 61 pivotally connected by arms 63 to the back section 51. In a manner similar to conventional surgical tables, the sections 51, 53, 55, and 61 are adapted for Trendelenburg tilting by various actuating means, not shown. Each of the table sections 51, 53, and 55 has a flat sheet metal top 60 bent downwardly at the lateral edges of the table to form a lip or side flange 62. In the angle between the top 60 and flange 62 of each table section is firmly fixed (e.g., by welding) a clamping rail of the channel shaped cross section best seen in FIG. 4, having a top flange or web 65 lying against the under side of the sheet metal plate 60, an outer vertical flange or web 67, and an inner vertical flange or web 69, spaced substantially from the flange 67 as seen. The flange 69 is somewhat thicker and longer than the flange 67 and has on its inner face, adjacent its free end, a V-shaped groove or notch 71 with which engages a portion of the accessory clamp as hereinafter described. The extreme margin of the sheet metal table top is preferably bent around the bottom edge of the outer flange 67 of the clamping rail, as shown in FIG. 4. The clamping rail serves also as a strengthening member or reinforcement for the sheet metal table sections, enabling each table sections to be made satisfactorily of thinner sheet metal than would otherwise be required. The various table sections are preferably upholstered with a covering of leather, fabric, or plastic sheeting, omitted from the drawings for clarity.

The surgical table top construction thus far described is suited to receive interchangeably any of the various forms or modifications of the clamping means as herein disclosed. However, for the sake of clarity and simplicity, only two forms of clamp, supporting various accessories are shown fixed to the table top illustrated in FIGS. 1 and 2.

As best seen in FIGS. 3–8, the first form of the accessory clamp of the invention includes an L-shaped body member having a horizontal flange 73 and a vertical flange 75, the latter being of such dimensions that it may fit between the flanges 67 and 69 of the clamping rail, as illustrated. Approximately centrally of the rear face of the flange 75 there is formed a rectangular recess or depression 77 from which extend a pair of laterally spaced slots or grooves 79. The grooves 79 open at the bottom face of the clamp body member and are formed as extensions of the recess 77, thus the recess 77 along with the slots 79 form an inverted U-shaped depression within which is pivoted a locking lug or dog which engages releasably in the notch 71 of the rail to prevent accidental detachment of the clamp from the rail.

The locking dog includes a cross member 81, pivotally secured to the vertical flange 75 by a transversely extending pivot pin 83, and a pair of downwardly extending arms 85 and 87, each being adapted to be received in one of the grooves 79. Formed on the outer surface of the arms 85 and 87 are alined transversely extending slots or grooves 89 which receive a portion of the flange 69 of the operating table side rail when the lower outer corner of the cross-member 81 of the locking dog is disposed within the side rail notch 71, as seen in FIG. 4. Disposed between the locking dog arms 85 and 87, and secured thereto, as by screws 91, is a release plate 93 which extends below the bottom of the body member to be in an accessible position for operation as hereafter described.

The body member 75 of the clamp is also provided with an inclined bore or aperture 95 opening into the recess 77 and alined with a shorter bore 97 formed in the inner face of the cross member 81 of the locking dog. A coiled compression spring 99 is disposed within the aperture 95 and bore 97 for urging the lower end of the locking dog outwardly away from the lower corner of the vertical flange 75, as seen in FIGS. 5, 7, and 8. The spring 99 is provided with a tapered configuration and has its axis disposed at an angle to the plane of the cross-member 81 to permit the locking dog to pivot without binding with or being obstructed by the spring 99. As seen in FIGS. 7 and 8, the top inner corner of the cross-member 81 is beveled or chamfered at 101 and has an approximately central groove 103 (see FIG. 7) to permit the locking dog to pivot without engaging the wall of the recess 77 or the locking stud or bolt 105.

The locking stud 105 is disposed within a vertical opening 107 extending through the vertical flange 75 with a portion of its length opening into the recess 77. The lower end of the stud 105 has an enlarged threaded portion 109, engaged with the internally threaded wall of the opening 111, and a knurled turning knob 113 which is adapted to have its upper end seated within the circular recess 115 when the stud 105 contacts the flange 65 (see FIG. 4) of the surgical table side rail.

The horizontal flange 73 of the clamp body has a vertical opening 117 which is approximately parallel to the bore 107 and which is adapted to receive and frictionally retain the support rod 119 (shown in part in FIG. 3) of the particular accessory being attached. It is of course obvious that the shape and size of the opening 117 may be varied to receive support rods 119 of different configurations without departing from the scope or spirit of the invention. A vertical cut-out slot 121, extending from the opening 117 to one edge of the flange 73, permits the free end 123 of the flange 73 to be drawn up by a locking screw or stud 125 passing through a bore in the part 123 and threaded into the bore 127, thus clamping the parts tightly on the rod 119. On the outer end of the clamping screw 125 is a knurled knob 129, a portion of which is adapted to seat within a circular recess 131 when the screw 125 is turned to tightened position. As seen in FIG. 5, the portion of the flange 73 opposite to the slot 121 is of reduced width to impart greater resiliency to the spring arm 123. The body of the clamp is preferably constructed of aluminum which, as is generally known, may be repeatedly distorted or bent to a limited degree without becoming permanently set or fractured.

In use, the clamp may be applied at any point along the length of the side rail of the surgical table merely by first placing the clamp with its vertical flange 75 against the inner face of the side rail flange 69 with the locking stud 105 withdrawn, as shown by solid lines in FIG. 1, and then moving the clamp upwardly so as to dispose the upper end of the flange 75 between the side rail flanges 67 and 69, as seen in FIG. 4. During the upward movement of the clamp, the free end of the side rail flange 69 engages with the locking dog cross-member 81, causing the dog to rotate clockwise, as seen in FIG. 4, about the pin 83 against the action of spring 99. Once the vertical movement of the clamp is sufficient to locate the cross-member 81 opposite the V-shaped notch 71 in the side rail flange 69, the spring 99 automatically urges the lower portion of the cross-member into the notch 71, thus latching the clamp in the slot of the side rail, while the free end of the flange 69, directly below the notch 71, is received by the slots 89 of the locking dog arms.

As previously indicated, one of the advantages of the clamp construction of the present invention is that it may be applied to the surgical table side rail directly at the desired location. However, once the clamp is applied to the side rail of the table, as described above, it may be adjusted merely by sliding the clamp along the side rail. The clamp may be fixed in position by rotating the knob 113 until the end of the stud 105 bears against the flange 65 of the side rail, as seen in FIG. 4, thus forcing the cross-member 81 tightly against one face of the notch 71 and thereby preventing any pivotal movement of the locking dog until the stud 105 is again loosened.

The particular accessory to be supported by the clamp is secured to the clamp either before or after the clamp has been attached to the side rail of the table, with the latter procedure being preferable. The various surgical table accessories presently employed are usually carried by a support rod of circular or rectangular cross section, with each of the rods of the same cross-section being of approximately the same size. Therefore, it is only necessary to provide the clamps with either a rectangular opening or a circular opening, as shown at 117, to adapt the clamps for use with existing accessories.

In securing the accessory to the clamp, the knob 129 is turned to withdraw the screw 125 from the bore 127 and thus permit the opening 117 to assume its maximum size. The accessory support rod 119 is then passed through the opening 117 and adjusted to position the accessory at the desired elevation, after which the screw 125 is turned by knob 129 to move the spring arm 123 toward the opposite face of the slot 121 until the desired degree of friction between the rod 119 and the wall of the opening 117 is attained. As seen in FIG. 1, a tray 133 is attached to a side rail clamp by a support rod 119 of circular configuration, while in FIG. 2 a shoulder support 135 and one end of a foot rest 137 are attached to side rail clamps by means of support rods of rectangular construction. The accessories shown in FIGS. 1 and 2 are intended merely to illustrate typical accessories with which the present invention is adapted for use, it being understood that various other accessories may be employed which are adapted to support or brace parts of the patient, such as heel stirrups, leg holders and knee crutches, or to support additional equipment, as for example an anesthetist's screen.

In removing the accessory from the clamp, it is only necessary to loosen the screw 125 to enlarge the opening 117 and permit the accessory support rod to be removed therefrom. The clamp itself is released from the side rail first by turning the knob 113 until the upper end of the stud 105 lies approximately flush with the top edge of the flange 75, see FIG. 7. At this time, the clamp is still retained on or latched in the side rail by the engagement of the locking dog cross-member 81 in the V-shaped notch 71 of the side rail flange 69 and may be removed therefrom by moving the release plate 93 to the position shown by dotted lines in FIG. 7. This movement pivots the locking dog so as to disengage this cross-member 81 from the side rail notch 71 and allows the clamp to move downwardly from between the side rail flanges 67 and 69.

With reference to FIGS. 9–17, there is shown a second embodiment of the invention which is similar in many respects to the first described embodiment. However, incorporated in this second embodiment are additional features which facilitate angular adjustment of the accessory relative to the plane of the surgical table and permit the accessory and clamp to be fixed in set position relative to the table side rail by movement of a single clamping screw.

The second embodiment of the invention includes a clamp block or body 139 having, at its rear end, an upwardly extending rectangular projection or lip 141, which corresponds generally to the upper end of the vertical flange 75 of the previously described embodiment, while its front face is of a generally circular outline. Approximately centrally of the front face of the clamp block 139 is provided a circular opening 143 which connects with a larger circular opening 145, the latter in turn opening into a rectangular recess or depression 147 formed in the rear face of the clamp block. A rectangular locking lug or dog, including a cross-member 149 and a release plate 151 of reduced thickness, is mounted within the recess 147 for pivotal movement about the pin 153 passing through the cross member 149 and the adjacent portion of the clamp block. A coiled compression spring 146, engaged within the clamp block and cross member openings 148 and 150, respectively, urges the locking dog counterclockwise as seen in FIG. 12, and has a tapered configuration to eliminate any tendency for it to bind within the openings 148 and 150 as the dog is pivoted. To permit pivotal movement of the locking dog without obstruction by other parts of the clamp, the cross member 149 has its top outer corner beveled or chamfered at 155 and the central portions of its inner and bottom faces are recessed as shown at 157, while the release plate 151 has an approximately rectangular opening 159.

Figure 13:
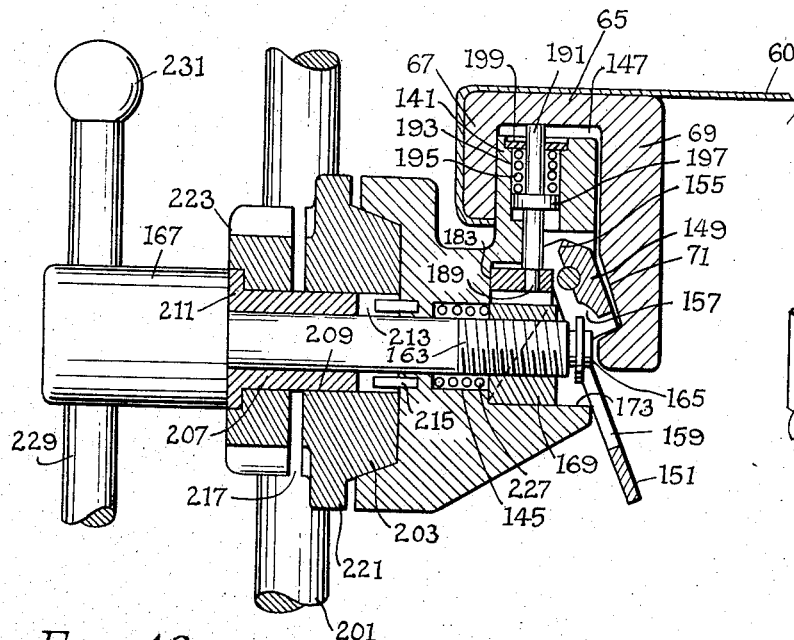
FIG. 13 is a central vertical section taken approximately on the line 13—13 of FIG. 9 showing the clamp locked in fixed position on the table side bar.
Figure 15:
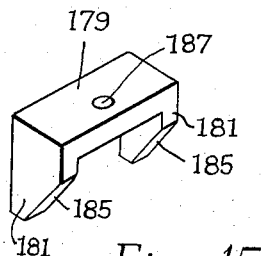
FIG. 15 is a perspective view of a wedge block employed in the structure of FIGS. 9-14.
Figure 16:
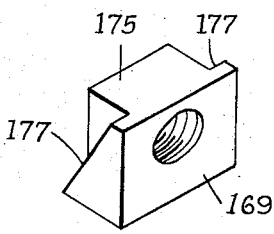
FIG. 16 is a perspective view of a cam block or nut employed in the structure of FIGS. 9-14.
Figure 14:
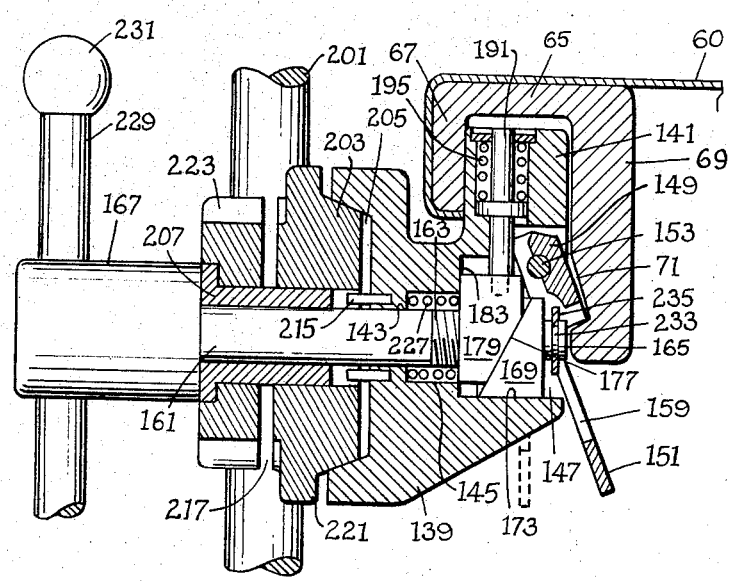
FIG. 14 is a view similar to FIG. 13 illustrating the clamp in released position.
Figure 17:
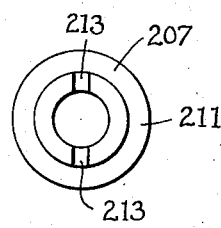
FIG. 17 is an end view of a bushing employed in the structure of FIGS. 9-14.

Extending through the clamp block openings 143 and 145 is an actuating or locking screw or stud 161 having, on one end, a threaded portion 163 and a portion 165 of reduced diameter, both extending into the recess 147, and a head 167 on its opposite end. A rectangular cam block or nut 169 is threaded onto the portion 163 of the screw 161 and is adapted for sliding movement along the bottom wall 173 of the recess 147 as the screw 161 is turned, with its rectangular shape preventing it from rotating. The nut 169 has a central projection 175 and an inclined or tapered cam surface 177 located on either side of the projection 175, as seen in FIG. 16. An inverted U-shape wedge block, having a web 179 and a pair of flanges 181, is disposed between the nut 169 and the wall 183 of the recess 147 with the screw 161 and the projection 175 of the nut 169 being received between the wedge block flanges 181, which are provided with corresponding inclined or tapered cam faces 185 which engage with the cam surfaces 177 of the nut 169, as seen in FIG. 14. The web 179 of the wedge block is provided with an aperture 187 which receives the reduced end portion 189 of the locking bolt 191 which is movable vertically within the opening 193 extending through the top surface of the projection 141 to the recess 147. A coiled compression spring 195 encircles the bolt 191 and urges it downwardly, to the position shown in FIG. 14, by bearing downwardly against the circular shoulder 197, fixed to the bolt 191 at approximately its midpoint, and reacting upwardly against the washer 199 staked in place at the upper end of the opening 193. The upper end of the bolt 191 is adapted to engage with the web 65 of the side rail or clamping rail of the surgical table, as seen in FIG. 13, for locking the clamp in fixed position in a manner similar to the locking stud 105 of the previously described embodiment.

Disposed between the front face of the clamp block 139 and the rear face of the screw head 167 is a split clamp plate 221 adapted to receive the support rod 201 of the surgical table accessory. The rear face of the clamp plate is provided with a circular tapered projection 203 which is received within a complementary recess 205 formed in the front face of the clamp block 139. The clamp plate is rotatable about the locking screw 161 to position the accessory in various angular locations relative to the plane of the surgical table top. To insure that no rotary motion is transmitted to the clamp plate as the screw 161 is turned, a bushing 207, interposed between the screw 161 and the wall of the clamp plate opening 209, has at one end an outwardly extending flange 211 which engages with the head 167 of the screw 161, while on its opposite end it is provided with a pair of slots 213 which receive the end portions of the pins 215 extending outwardly from the clamp block 139 parallel to the axis of the bolt 161.

The clamp plate is partially split by a vertical slot 217 which extends from an edge portion of the plate to an enlarged circular opening 219. The front portion of the clamp plate 221 functions as a resilient arm 223 which is movable by the head 167 approximately axially of the screw or bolt 161, thereby altering the shape and size of the opening 219 and gripping the support rod 201 which may be disposed therein. As seen in FIG. 11, the thickness of the arm 223 is reduced at 225 in order that the arm 223 may bend more easily without introducing any breaking stresses into the material.

One of the advantages of this clamp modification is that the clamp plate 221 is at all times subject to a resilient load or force tending to draw it inwardly toward the clamp block 139. This resilient force or preloading on the clamp plate not only increases the frictional contact between the periphery of the projection 203 and the wall of the recess 205, but in addition imparts a slight bending to the clamp plate resilient arm 223 which tends to reduce the size of the opening 219. In this manner, the clamp plate 221 once adjusted to the desired angular position and the accessory support rod 201 once adjusted to the correct elevation are frictionally held in adjusted position even before the actuating screw or bolt 161 is advanced to lock the clamp in place as hereafter described. This preloading is accomplished by means of the coiled compression spring 227 which encircles the screw 161 and is disposed within the clamp block opening 145 so as to bear against the vertical face of the projection 175 of the cam nut 169. The spring 227 tends to move the nut 169 to the right, as seen in FIG. 14, which movement is transmitted to the clamp plate through the screw 161 and screw head 167.

The screw head 167 is provided with a diametrically formed aperture in which is slidably disposed a turning pin or handle 229 having enlarged end portions 231, either or both of which may be threadedly removed. The turning pin 229 enables easy manipulation of the actuating screw 161, and also functions as a lever, by means of which a greater degree of tightening of the screw 161 can be had. To prevent withdrawal of the screw 161 from the nut 169, which would result in a disassembly of the various clamp elements, the reduced end portion 165 of the screw 161 is provided with a peripheral groove 233 which receives a split washer 235. The washer 235 is adapted to engage with a nut 169, thereby limiting the withdrawal of the screw 161 and thus functioning as a stop.

In operation, this embodiment of the clamp is applied to the surgical table side rail in the same manner as the previously described embodiment by first locating the clamp projection 141 against the side rail flange 69 and then moving the clamp upwardly. This movement positions the clamp as shown in FIG. 14 with the cross member 149 of the locking dog engaged with the groove 71 of the side rail flange 69. It will of course be understood that the screw 161 must be first turned to a withdrawn position to insure that the locking bolt 191 assumes a position as shown in FIG. 14 before the clamp is applied to the side rail.

As with the previous embodiment, the clamp may be applied to the table side rail directly at the desired location or may, after being attached as described above, be adjusted to the desired location along the length of the side rail. Once in position, the accessory support rod 201 is disposed within the clamp plate opening 219 and the clamp plate 221 is turned relative to the clamp block 139 to tilt the rod 201 to the most suitable angle. The rod 201 and the clamp plate will be frictionally held in adjusted position as described above, thus leaving both hands of the operator free for manipulating the screw 161. As the screw 161 is advanced, its threaded connection with the nut 169 draws the cam nut toward the wall 183 of the recess 147 with its cam surfaces 177 engaging the cam faces 185 of the wedge block 179, thereby urging the wedge block into elevated position. The wedge block in turn moves the locking bolt 191 upwardly against the action of the spring 195, into contact with the side rail web 65, securely locking the clamp in place. In addition, the advancement of the screw 161 moves the clamp plate bodily toward the clamp block 139 frictionally fixing it in adjusted angular position, and also bends the arm 223 of the clamp plate tightly against the accessory support rod 201.

In releasing the clamp from fixed position and also to permit the removal or adjustment of the support rod 201, the screw 161 is turned by the pin 229 to move the nut 169 toward the side rail flange 69, thereby allowing the spring 195 to return the pin 191 and the wedge block from their elevated positions shown in FIG. 13 to that of FIG. 14. This movement of screw 161 also releases the gripping force applied to the accessory support rod 201 and enables its adjustment or withdrawal. The clamp may be bodily removed from the side rail by moving the release plate 151 of the locking dog to a position as shown by broken lines in FIG. 14, against the action of spring 146 (FIG. 12) to withdraw the locking dog cross-member 149 from the notch 71 in the side rail flange 69.

Referring now to FIGS. 18–24, there is shown a third embodiment of the invention which is similar in some respects to the last described clamp embodiment in that the accessory support rod is secured in fixed position relative to the clamp and the clamp is secured in fixed position relative to the surgical table by actuation of a single screw member. However, the means and manner of accomplishing these results differ from that of either of the previously described embodiments, both in construction and mode of operation.

The clamp structure of this third embodiment is also adapted for attachment to the side rails of a surgical table and includes a clamp block or body 236 having a rectangular vertically extending projection or lug 237 which is received between the flanges 67 and 69 of the side rail in a manner similar to the projection 141 of the last described clamp construction. As seen in FIGS. 21 and 22, the clamp block is provided with a recessed portion 239, open at the rear and bottom surfaces of the block, in which is pivotally mounted, on the pin 241, a toggle or pivot block 243. The outer end of the toggle 243, directly below the projection 237 on the clamp block, is provided with an upwardly extending pivot lug 245 to which is pivotally mounted, by pin 247, a locking dog including a release plate 249 and a U-shaped cross-member 251 having arms 253 and 255 disposed on either side of the lug 245 and pierced by the pivot pin 247. The arm 253 is spaced axially from the lug 245 to allow room for the spring 257 to encircle the pin 247 in this space. The spring 257, with its ends engaging the toggle 243 and the locking dog cross member 251, urges the dog in a counterclockwise direction, as viewed in FIG. 22, into engagement with the shoulders or stops 259 (FIG. 24) extending laterally from the toggle. A similar spring 261 encircling the pivot pin 241, engaging the toggle 243 and the edge of the clamp block bottom wall 263, urges the toggle, along with the locking dog, in the same counterclockwise direction. A set screw 265, threaded into the vertical opening 267 formed in the clamp block projection 237, serves as a stop for limiting the counterclockwise movement to the desired extent.

The front end of the toggle 243 is provided with an abutment face 269 which projects into the opening formed by the rectangular slots 271 and 273 passing through the clamp block at approximately right angles to each other, the former vertical and the latter horizontal when the clamp is mounted on a horizontal rail. The support rod 275 of rectangular cross section is adapted to be received in either the slot 271 or 273 for either vertical or horizontal positioning, and is held in place by a screw or stud 277 having a knurled head 278 and threaded through the front wall 279 of the clamp block opposite the front lower end of the toggle, with its axis disposed in a horizontal plane located slightly below a similar plane passing through the pivot pin 241. To prevent the abutment face from obstructing the movement of the support rod 275 through the slot 271 or 273, the edges of the abutment face are beveled or chamfered at 280 and thus serve as guide surfaces.

In operation, the clamp, with the accessory support rod 275 usually but not necessarily removed, is applied to the side rail of the surgical table by first moving the release plate 249 of the locking dog, against the action of spring 257, into the position shown by broken lines in FIG. 22, and then moving the projection 237 of the clamp block 236 upwardly between the flanges 67 and 69 of the side rail. Once the clamp is in this position the plate 249 is released by the operator, allowing the spring 257 to urge the lower corner of the locking dog cross member 251 into the groove 71 of the side rail flange 69. If the cross member 251, when moved into position shown by broken lines in FIG. 22, still projects from the rear face of the clamp block and prevents the projection 237 from entering between the side rail flanges 67 and 69 or if the locking dog fails to make good contact with the bottom wall of the groove 71, it is only necessary to adjust the set screw 265 which in turn adjusts the limit of the counterclockwise swing of the toggle 243 to which the locking dog is pivoted. The clamp is now attached to the table side rail and may be moved, if desired, longitudinally thereof to the most suitable position. With the screw 277 withdrawn or loosened, as shown in FIG. 22, the accessory support rod 275 may be disposed in either the slot 271 or 273 if not already therein, and is locked in place by advancing or tightening the screw 277. The rod 275 is thinner than either of the slots 271 and 273, so is capable of limited movement in these slots in a direction axially of the clamping screw 277. Thus when the screw 277 is tightened, it moves the rod 275 against the abutment face 269 of the toggle 243, causing the toggle to pivot clockwise about pin 241, against the action of spring 261, thus urging the cross member 251 of the locking dog firmly downwardly into engagement with the bottom inclined face of the groove 71 of the side rail flange 69. Once the screw 277 is advanced to its limit, the rod 275 will be gripped between the end of the screw 277 and the abutment face 269 of the toggle 243.

Figure 23:
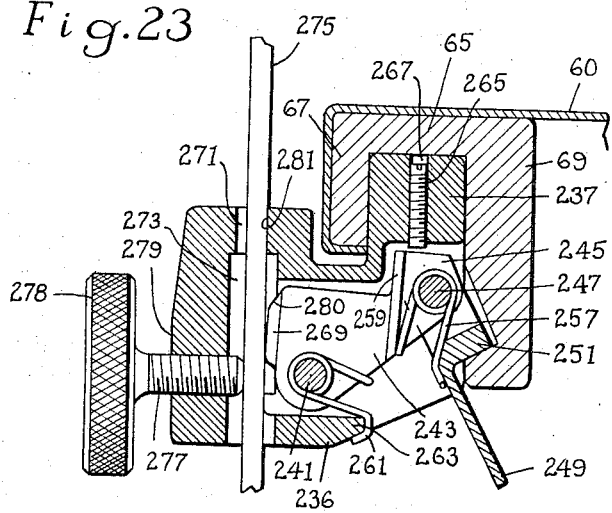
FIG. 23 is a section similar to FIG. 22 showing the clamp and accessory in locked position.
Figure 24:
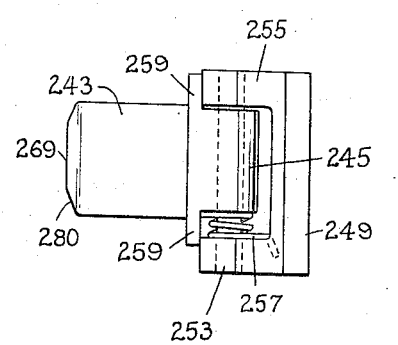
FIG. 24 is a detail top plan of the toggle employed in the structure of FIGS. 16-23.
Figure 25:
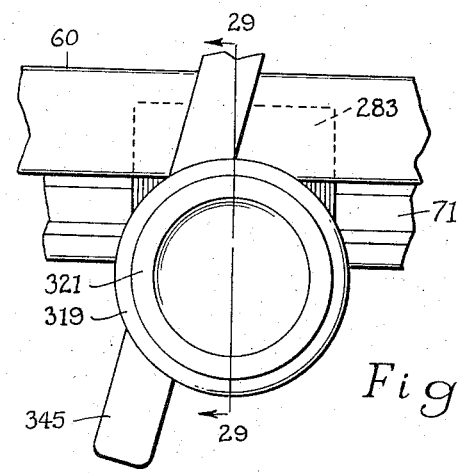
FIG. 25 is a front elevation of still another embodiment of the invention secured to the side rail of an operating table, shown in part.
Figure 27:
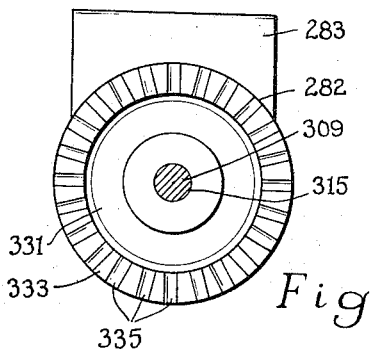
FIG. 27 is a transverse vertical section taken approximately on the line 27—27 of FIG. 29.
Figure 28:
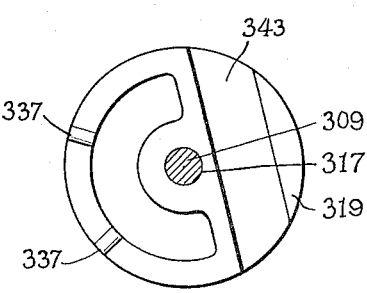
FIG. 28 is a transverse vertical section taken approximately on the line 28—28 of FIG. 30.
Figure 26:
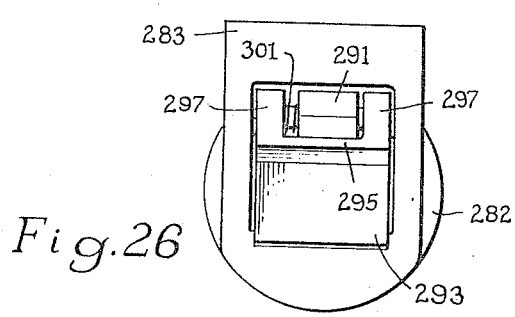
FIG. 26 is a rear elevation of the clamp shown in FIG. 25.

When the support rod is disposed in the horizontal slot 273, the rod bears directly on the clamp block, which in turn transmits the load on the accessory directly to the surgical table side rail. In this case, the engagement of the toggle abutment face 269 and the end of the screw 277 with its support rod 275 serves largely to prevent lateral movement of the rod 275 (in addition to transmitting pressure through the rod to the clamping toggle 243) and does not have to support the weight of the rod 275 or of any accessory connected thereto. However, when the support rod 275 is disposed vertically, as seen in FIGS. 22 and 23, the support rod is frictionally retained in position and it is therefore essential that sufficient frictional contact exist between the clamp parts and the support rod to prevent the rod from sliding downwardly when it is subjected to a load. As seen in FIG. 23, the upper end of the slot 271 is of reduced size, only slightly thicker than the thickness of the rod 275, and has its innermost vertical wall 281 disposed in a plane passing through the lower edge of the toggle abutment face 269. In this manner, the accessory support rod 275, when arranged vertically, makes contact with the wall of the upper part of the vertical slot 271, as well as with the toggle abutment face 269, as the screw 277 is advanced to its limit. In the preferred position of adjustment, the rod 275 engages the whole length of the wall 281 of the slot 271, since this wall and the lower edge of the toggle abutment face 269 are in coplanar relationship and the force of the screw 277 is directed toward the lower edge of the abutment face causing little or no bending of the support rod itself. The support rod is thereby firmly gripped to withstand the loads it is expected to carry in normal use.

Another embodiment of the invention shown in FIGS. 25–31 employs a toggle arrangement similar to that of the last described clamp embodiment. However, the manner of actuating the toggle and the construction of this further embodiment differ from any of the previously described clamp structures, as will be evident from the following description.

Figure 29:
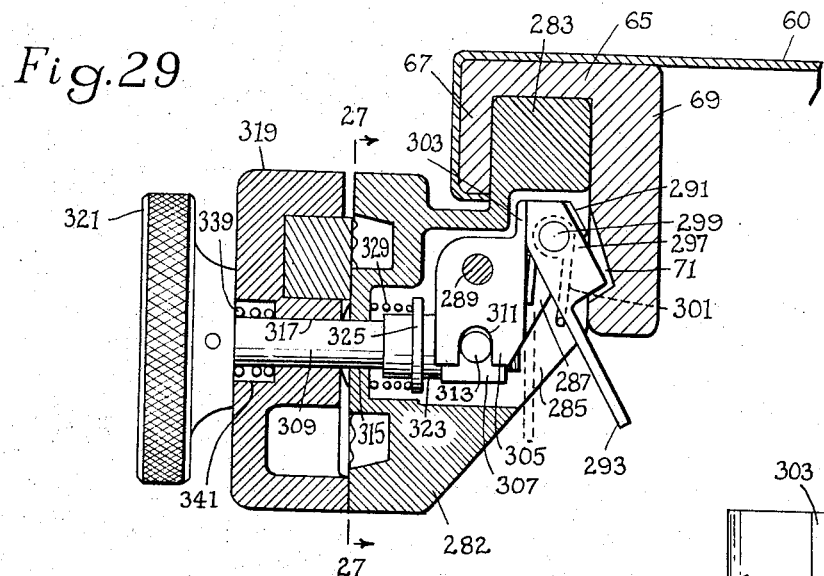
FIG. 29 is a central vertical section taken approximately on the line 29—29 of FIG. 25, showing the clamp in unlocked or released position.
Figure 31:
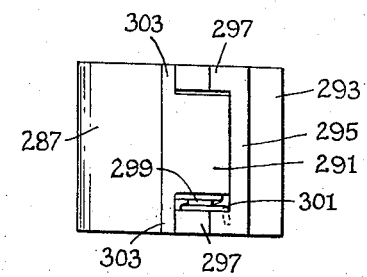
FIG. 31 is a detail top plan of the toggle arrangement employed in the structure of FIGS. 25-30.
Figure 30:
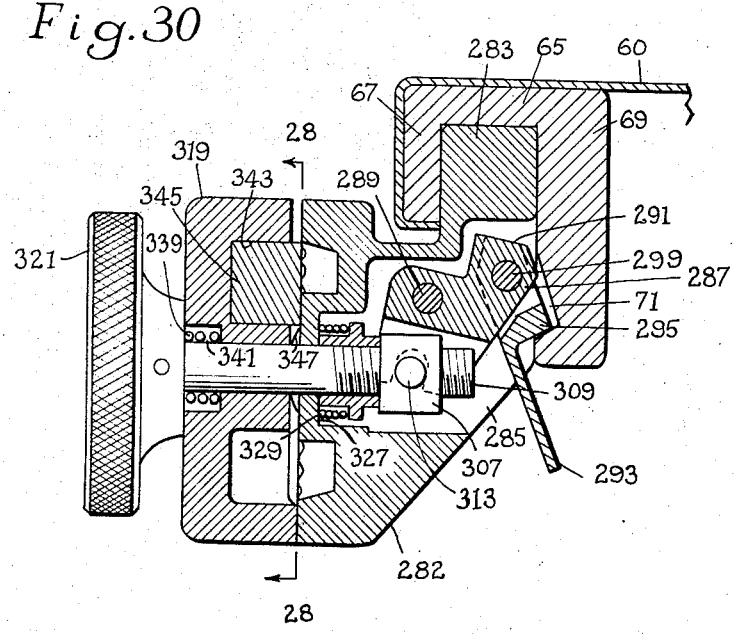
FIG. 30 is a view similar to FIG. 29 showing the clamp in locked position.

As seen in FIGS. 29 and 30, the clamp block 282 has an integral upwardly extending projection 283, adapted to be received between the flanges 67 and 69 of the surgical table side rail, and a recessed portion 285, opening at the rear end of the clamp block. Within the recess 285 is a toggle 287 mounted on the pivot pin 289, in laterally offset relationship with respect to the longitudinal axis of the clamp, and having an upwardly extending pivot lug 291 located directly below the projection 283. A locking dog including a release plate 293 and a cross member 295, having a pair of pivot arms 297, is pivotally mounted on the toggle pivot lug 291 by the pin 299, extending through alined apertures in the lug 291 and the arms 297 of the locking dog cross member. A coiled spring 301, disposed between one of the pivot arms 297 and the toggle pivot lug 291, encircles the pin 299 and has its ends engaging the toggle 287 and the locking dog cross member 295 so as to urge the locking dog counterclockwise, as viewed in FIG. 29, against the shoulders or stops 303 (FIG. 31) which project laterally from the toggle 287.

The bottom face of the toggle 287 is grooved or slotted longitudinally to provide downwardly extending arms 305 which straddle a toggle actuating nut 307 threaded on the screw stud 309. Each of the arms 305 has a vertical slot 311 within which is received one of the pins 313 projecting laterally from opposite sides of the actuating nut 307. In this manner, any movement of the nut 307 axially on the stud 309 serves to rock or pivot the toggle 287 about its pivot pin 289.

The stud 309 extends through a central opening 315 in the front face of the clamp block 282 and the central opening 317 of the clamp plate or cap 319 and is provided with a suitable knurled knob 321 on its outer end. A bushing or sleeve 323, having a peripheral rim or shoulder 325, is disposed on the stud 309 between the toggle actuating nut 307 and the wall 327 of the recessed portion 285. A coiled spring 329, encircling the sleeve 323 and bearing against the shoulder 325 and wall 327, tends to move the toggle actuating nut 307 and stud 309 to the right, as viewed in FIGS. 29 and 30, causing the toggle 287 (when the screw 309 is not tightened) to pivot counterclockwise to loosen the pressure between the locking dog and the bottom wall of the groove 71 of the side rail flange 69.

The front face of the clamp block 282 has a circular annular groove 331 leaving a circular edge portion 333 which is provided with radially extending serrations or grooves 335. The adjacent surface of the clamp cap 319 is provided with a pair of radially extending arcuately spaced ribs or detents 337 (FIG. 28) which are adapted to be selectively received in certain of the grooves 335 for preventing rotatable movement of the clamp cap 319 relative to the clamp body 282 as the knob 321 is turned. The ribs 337 of the clamp cap are maintained in engagement with the grooves 335 of the clamp body, even when the stud 309 is not in tightened position, by the coiled spring 339, seated within the central recess 341 in the front face of the clamp cap and bearing against the knob 321 to urge the cap 319 against the clamp block. The spring 339 is of such construction as to exert a resilient force less than that of the spring 329.

The rear face of the clamp cap 319 is also provided with a transverse groove 343 (FIG. 28) offset to one side of the screw 309 and of rectangular or square cross section which is adapted to receive the accessory support rod 345, of corresponding cross section. Since the spring 339 tends to move the rear face of the clamp cap against the clamp body, a spring washer 347, of dished or arched cross-section, is placed on the stud 309 between the clamp cap and body to overcome a part of the resilient force exerted by the spring 339. In this way the clamp cap is spaced a slight distance away from the clamp body to permit the accessory support rod 345 to be inserted easily into the groove 343 in the clamp cap 319.

This clamp embodiment is applied to the surgical table side rail in a manner similar to the previously described embodiments. With the stud 309 in partially loosened or released position, the locking dog release plate 293 is moved clockwise, against the action of spring 301, to position the locking dog as shown by broken lines in FIG. 29. The clamp block projection 283 is then moved upwardly between the side rail flanges 67 and 69, at which time the operator releases the plate 293 and the locking dog is snapped into latching position, shown in full lines in FIG. 29, by the spring 301. All the clamp embodiments of the present invention are adapted to be applied to the surgical table directly at the desired position. However, if for some reason it is necessary to adjust the clamp along the length of the side rail, once it has been applied thereto, such an adjustment is accomplished by merely sliding the clamp along the side rail, which requires neither removal of the clamp from the side rail nor any manipulation of the clamp elements, other than the above noted movement.

The clamp is now ready to receive the accessory support rod 345 (if the same was not inserted prior to latching the clamp on the rail) which may be inclined, in a plane parallel to the surgical table side rail, to any desired extent. This angular positioning of the support rod 345 is accomplished by first pulling the clamp plate 319 outwardly away from the clamp block, against the action of spring 339, to disengage the detents 337 from the grooves 335, and then rotating the plate 319 until the rectangular slot 343 is disposed at the desired angle. As the clamp plate 319 is then released by the operator, the spring 339 moves this plate toward the clamp block, causing the detents or ribs 337 to engage with corresponding grooves 335 formed in the front face of the clamp block. In this position the clamp plate 319 is prevented from rotating as the knob 321 is turned and is spaced slightly from the front face of the clamp block, by the resilient action of the spring washer 347, to permit the support rod 345 to be easily inserted into the grooves 343.

Once the support rod 345 is seated within the groove 343, the stud 309 is advanced or tightened by turning the knob 321, the rear face of which bears against the clamp cap 319 and urges it against the front face of the clamp block to grip firmly the support rod 345 therebetween. It will be noted that the support rod 345 makes substantial contact with both the clamp cap and block, thus sufficient friction is created to retain the support rod in place under normal loading conditions. In addition to fixing the accessory support rod, the advancement of the stud 309 also causes the internally threaded nut 307 to move axially thereof to rock the toggle 287 into position as shown in FIG. 30. In this position the bottom face of the locking dog cross member 295 bears against the bottom face of the side rail groove 71 and thus locks the clamp in fixed location. In removing the clamp from the table side rail, it is merely necessary to reverse the above described steps, loosening the knob 321 and screw 309 sufficiently so that the plate 293 may be manually swung outwardly (toward the knob 321) to unlatch the clamp from the rail.

Figure 32:
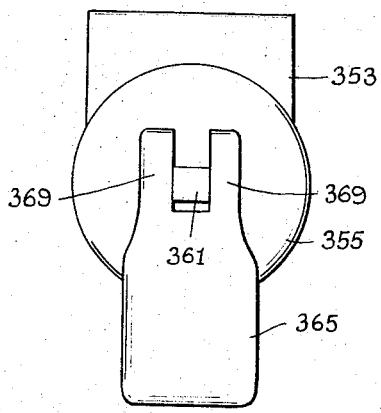
FIG. 32 is a front elevation of still another embodiment of the invention.
Figure 33:
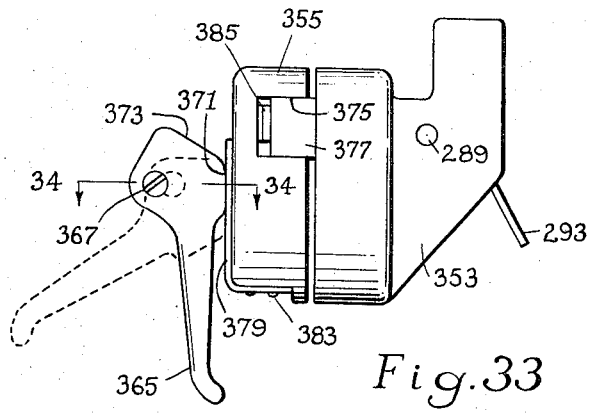
FIG. 33 is a right side elevation of the structure shown in FIG. 32.
Figure 34:
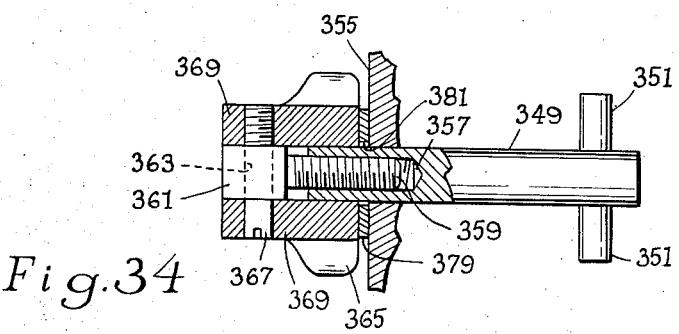
FIG. 34 is a horizontal section taken approximately on the line 34—34 of FIG. 33.

The structure shown in FIGS. 32–34 is a quick release actuating lever means which may be employed in lieu of the nut 307, stud 309, and knob 321 of the last described embodiment, to provide a simplified construction which is equally effective in carrying out the desired purposes.

Substituted for the stud 309 of the construction shown in FIGS. 25–30, is a sliding rod or bar 349 having a pair of laterally projecting ears 351 which are received in the slots 311 of the toggle 287 in the same manner as were the pins 313 of the previous embodiment. The sliding bar 349 is also provided with a spring and sleeve 329 and 323, as is shown in FIG. 29, which are omitted from FIG. 34, however for the sake of simplicity. The bar extends outwardly through the clamp block 353 and clamp cap 355 as seen in FIG. 34. The outer end of the bar 349 has an axial threaded opening 357 into which is threaded a screw 359 having a head 361 through which extends, at approximately right angles to the axis of the bar 349, a bore 363.

A bifurcated actuating lever 365 is secured to the sliding rod 361 by the pivot pin 367 extending through the bore 363 and through alined apertures in the arms 369 of the actuating lever 365. The upper end of the actuating lever 365 is provided with straight edge portions or faces 371 and 373 intersecting at an angle greater than 90° and is slightly rounded at the angle between these faces, which form a cam surface for drawing the rod 349 outwardly against the force of the spring 329 and simultaneously pushing inwardly on the cap 355. As seen in FIG. 33, the perpendicular distance from the center of the pivot 367 to the edge portion or face 371 is greater than the corresponding distance from the pin to the edge portion or face 373. Therefore, when the lever 365 is in the position shown by solid lines in FIG. 33, the sliding bar 349 is held in its outer position, pulling on the toggle 287 to rock or tilt it about its pivot 289 and lock the clamp and accessory in fixed position, as shown in FIG. 30. Positioning of the lever 365 as shown by broken lines in FIG. 33, permits the spring 329 to move the bar 349 toward the rear of the clamp, releasing the toggle 287 to the slack position shown in FIG. 29.

Here again the clamp cap has a rectangular groove 375 the same as the groove 343 previously mentioned, in which is received the accessory support rod 377. In the previously described modification the adjacent faces of the clamp cap and body were provided with interengaging detents 337 and grooves 333 which prevented the clamp cap from rotating as the stud 309 was turned. In this present embodiment, however, the clamp cap 355 is not subjected to any rotary force and therefore the need for cooperating detents and grooves is not present. As seen in FIG. 33, a leaf spring 379, having an opening 381 through which the bar 349 extends, is disposed between the front face of the clamp cap 355 and the upper portion of the lever 365, and is secured, as by screws 383, to the periphery of the clamp cap. The spring 379 serves to urge the clamp cap 355 resiliently and lightly toward the clamp body when the lever 365 assumes the released position shown by broken lines in FIG. 33, and thus cooperates with the leaf spring 385, secured to the bottom wall of the groove 375, to frictionally retain the clamp cap and the accessory support rod 377 in adjusted position before the lever 365 is moved to locked position. If desired, a dished spring washer, such as the washer 347 shown in FIGS. 29 and 30, may be provided on the bar 349 for spacing the clamp cap 355 from the clamp block.

When the clamp handle 365 is in its loosened position, it may be rotated a few turns around the axis of the rod 349 to vary the clamping force produced when the handle is tightened.

The procedure of attaching this clamp structure to a surgical table side rail is the same as followed with the last described embodiment. Once the accessory support rod 377 is positioned in the groove 375, it may be swung to any desired inclination and locked in place by moving the lever 365 from its position shown by broken lines (FIG. 33) to that shown by solid lines. This movement causes the edge portion 371 of the lever 365 to urge the clamp cap toward the clamp body thereby firmly gripping the accessory support rod 377 therebetween. In addition, this pivotal movement of the lever 365 pulls the sliding rod 349 outwardly, against the action of spring 329, and rocks the toggle 287 into the position as shown in FIG. 30, to lock the clamp in place on the side rail. Here, again, it is only necessary to reverse the above described steps to release or slacken the latch so that it may be manually unlatched from the rail, whereupon the clamp structure may be moved downwardly away from the rail.

Figure 35:
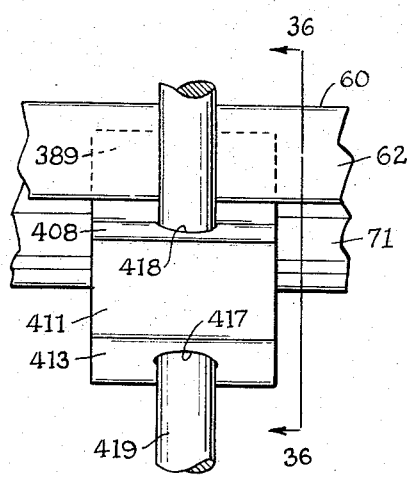
FIG. 35 is a front elevation of still another modification of the invention secured to the side rail of an operating table, shown in part.
Figure 36:
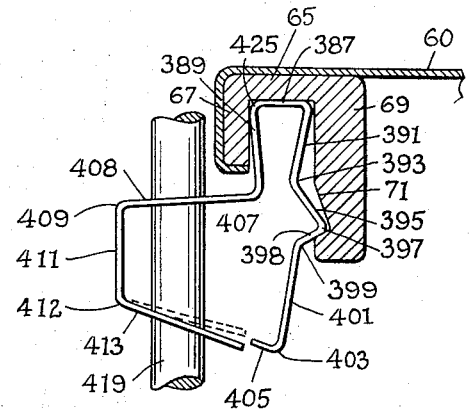
FIG. 36 is a vertical section taken approximately on the line 36—36 of FIG. 35.

Another embodiment of the invention, shown in FIGS. 35 and 36, is the most simple, both in construction and method of operation, and is lightest in weight. It is formed of a single piece of sheet metal having sufficient resiliency to return to its original or approximately original shape even after repeated bending to a limited degree.

The sheet material is bent into the configuration shown edgewise in FIG. 36 so as to form the upwardly extending projection which is received between the side rail flanges 67 and 69, which projection includes a horizontal top wall 387 and a pair of downwardly extending converging walls 389 at the front and 391 at the rear. From the lower end of the wall 391, the sheet is bent at 393 to extend obliquely downwardly and rearwardly at 395, then is bent again at 397 to extend obliquely downwardly and forwardly at 398, at substantially the same angle as the bottom inclined face of the groove 71 of the side rail flange 69. The sheet is then bent at 399 to extend downwardly and outwardly in a more nearly vertical direction at 401, to a further bend 403 whence it extends outwardly to form the bottom ledge 405. At the lower end of the other wall 389 of the rail-engaging part of the clamp is a bend 407, whence the sheet extends forwardly in a slightly inclined top gripping flange 408, which is bent at 409 to form the vertical front wall 411, at the lower edge of which the metal is bent rearwardly at 412 to form the bottom gripping flange 413.

The particular clamp cross section shown in FIG. 36 and the manner in which it is formed may, of course, be varied without departing from the spirit or scope of the invention. However, the clamp configuration shown is believed most suitable both from the standpoint of manufacture and operating efficiency. It will be noted that the downwardly and forwardly inclined walls 391 and 401 do not contact the flange 69 of the surgical table side rail, and this in no way obstructs the detent 397 from entering the latching groove 71 to the full extent. Further, the angle of the downwardly and slightly rearwardly extending wall 389 permits the clamp to be rocked or pivoted about the free end of the side rail flange 67 to move the clamp projection into or out of its position shown in FIG. 36.

The gripping flanges 408 and 413 are provided with openings 415 and 417, respectively, which are adapted to receive slidably the vertically disposed circular accessory support rod 419. The openings 415 and 417 are in axial alinement only when the flanges 408 and 413 are in parallel relationship, however, the openings are slightly larger than the diameter of the rod 419 and it is therefore only necessary to raise the bottom flange 413 slightly, as shown by broken lines in FIG. 36, to permit the rod 419 to pass freely through both openings 415 and 417. Once in position, if one lets go the bottom flange 413, the resilient force of the metal tends to move this bottom flange 413 downwardly away from the flange 408, thus twisting the flange 413 to a sharper angle relative to the axis of the support rod 419 and wedging the rod tightly in the opening 417.

In use, this clamp embodiment is attached to the surgical table side rail by first applying a clenching or compressive force to the front and rear walls 411 and 401, which will cause the angle 397 to move toward the front wall 411 far enough to enable the walls 389 and 391 to be moved upwardly into the vertical slot of the mounting rail. It will be noted that the ledge 405 lies above the normal plane of the bottom flange 413 to prevent any obstruction of the movement of the rear wall 401. The clamp is then moved upwardly between the side rail flanges 67 and 69, with perhaps a slight rocking movement about the free end of the side rail flange 67. The compressive force on the walls 401 and 411 is then removed, allowing the resiliency of the sheet material to drive the corner 397 and shoulder 398 into the latching groove 71 of the side rail flange 69.

The accessory support rod 419 is then applied to the clamp by first moving the bottom gripping flange 413 upwardly, as shown by broken lines in FIG. 36, to permit the rod 419 to pass freely through both flange openings 415 and 417. Once the support rod is at the desired elevation, the flange 413 is allowed to move downwardly by its own resilient force and thereby wedge the support rod in position as described above.

From a study of the construction shown in FIG. 36, it will be noted that the loads to which the support rod 419 is subjected in use are transmitted to the upper gripping flange 408, which tends to pivot counterclockwise about the bend 407, and to the bottom gripping flange 413, which tends to turn clockwise about the bend 412. These movements of the flange 408 and 413, in response to loads on the support rod 419, cause the edges of the openings 415 and 417 to engage the support rod 419 with a greater force, thus increasing the frictional or biting contact between these surfaces proportionately to the load. Further, loading of the support rod 419 creates a turning moment tending to pivot the clamp counterclockwise as viewed in FIG. 36, about the bend 425. As a result of this turning moment, the walls 391, 395, and 398, together with the corner or bend 397, are urged firmly toward the side rail flange 69, thereby increasing the force which maintains the detent or latch portion 398 engaged with the latching groove 71 of the side rail. The loading conditions of the accessory support rod therefore provide directly proportional variations both in the gripping or wedging effect of the flanges 408 and 413 on the support rod, and also the latching force of the detent or latch portion 398 on the side rail flange 69.

From the foregoing descriptions, it is seen that the clamp constructions of the present invention are each adapted for universal use on surgical tables provided with cooperating side rail structures, thus permitting each of the clamps to be utilized alone or in combination with other clamp modifications. In addition, all the clamp embodiments are adapted to be applied to the surgical table side rail directly at the desired location, may be adjusted relative thereto, and can be fixed in position in an easy and rapid manner without the use of special tools or skills. Furthermore, the clamps of the present invention incorporate features which permit various adjustments of accessory support rods relative to the surgical table, thereby eliminating the need for specially formed or shaped accessory support rods.

Various clamps according to the various constructions disclosed may all be used together on the same mounting rail, or on mounting rails of different sections of the same surgical table, according as one or another form of clamp may be found most suitable for holding one or another particular accessory or appliance. For example, one form of clamp (e.g., FIGS. 27–30) may be found best for holding a back rest which is subjected to severe turning or twisting forces, well resisted by the detents 337 engaging the grooves 335. Another form (e.g., FIGS. 32–33) may be more suitable for holding an appliance or accessory which is likely to require to be moved with great rapidity in the midst of a surgical operation. Another form (e.g., FIGS. 35–36) may be more suitable for holding relatively light loads when no large displacive forces are involved, such as a basin or an instrument tray. Thus the various forms are, in one sense, not alternatives mutually excluding each other, but all may be used together on a single surgical table, so that all forms may be considered as component parts of a single inclusive structure.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

I claim:

1. In combination with a table top section or the like a clamping rail extending along at least one side of said section, said rail having a longitudinal slot, and a clamping member received laterally within said slot means along said rail for permitting said clamping member to be laterally received in and removed from said slot at multiple positions along said rail and means for latching said member within said slot.

2. A construction in accordance with claim 1 including resilient means biasing said latching means to a latching position with said slot, thereby to automatically latch said clamping member within said rail when received laterally thereof.

3. In combination with a table top section or the like, a clamping rail extending along at least one side of said section, said rail having a longitudinal slot, and a clamping member received within said slot and means for latching said member within said slot, said latching means including a notch extending continuously longitudinally along substantially the full length of a sidewall of said slot and a latching portion on said clamping member being received within said notch and being slidable longitudinally of said notch.

4. A construction in accordance with claim 3 including locking means carried by said clamping means and rail transmitting locking force through said latching portion and between said notch and an opposing sidewall of said slot.

5. In combination with a table top section or the like, a clamping rail extending along at least one side of said section, said rail having a generally inverted U-shaped cross-section providing an upwardly disposed longitudinally extending slot adapted to upwardly receive the hereinafter claimed clamping member, said rail also having a longitudinal notch in one sidewall of said slot, a clamping member received within said slot and having a latching portion received within said notch.

6. A construction in accordance with claim 5 including means for locking said latching portion in said notch in turn locking said clamping member in said slot.

7. A construction in accordance with claim 6 in which said locking means is constructed to transmit locking force between said clamping member and a second sidewall of said slot intersecting said one sidewall.

8. In combination with a table top section or the like, a clamping rail extending along at least one side of said section, said rail having a generally U-shaped cross-section providing a slot, said rail also having a notch protruding laterally in a sidewall of said slot and extending longitudinally along substantially the full length of said rail in one sidewall of said slot, a clamping member received within said slot and having a latching portion being longitudinally slidably received within said notch.

9. In combination with a table top section or the like, a clamping rail extending along at least one side of said section forming the integral basic strengthening structural frame for the section, said rail having a longitudinal slot extending substantially the full length of said rail, and a clamping member received within said slot and means for latching said member within and longitudinally of said slot, a table top being formed integral with said rail.

10. In combination with a surgical table top, a pair of laterally spaced clamping rails to one of which accessories are adapted for clamping throughout substantially their entire length and a clamping member longitudinally slidable on said rails, said clamping rails forming the basic strengthening structural frame for a surgical table top section and a table top extending between said rails and formed integral therewith to provide a rigid table top section for a surgical table.

11. In combination with a surgical table, a pair of laterally spaced clamping rails to one of which accessories are adapted for clamping throughout substantially their entire length and a clamping member longitudinally slidable on said rails, said clamping rails forming the basic strengthening structural frame for a surgical table top section and a table top overlying said rails and formed integral therewith to provide a rigid table top section for a surgical table.

12. A construction in accordance with claim 11 in which each of said rails has an upward disposed generally inverted U-shaped longitudinal slot adapted to receive an accessories clamp.

13. The combination of a clamping rail having a slot extending longitudinally along the rail and having a notch depressed laterally into one side wall of said slot and extending longitudinally along said side wall and a clamping member being laterally received within said slot having a first portion of a size to slip easily into and out of said slot and adapted to be seated in said slot, said clamping member having a second portion movable with respect to said first portion and being resiliently biased and adapted to engage in said notch when said first portion is seated in said slot, to latch said clamping member to said rail and prevent removal therefrom until said second portion is withdrawn from said notch.

14. A construction as defined in claim 13, in which said clamping member also includes a third portion movable with respect to said first portion for engaging and clamping an accessory supporting rod.

15. A construction as defined in claim 13, in which said clamping member has means for expanding its size in a general direction from one wall of said notch to the bottom of said slot, thereby to lock said clamp member in said slot.

16. A construction as defined in claim 13, in which a table top section of sheet metal embraces at least two sides of said rail and is strengthened thereby.

17. A surgical table construction including a sheet metal table top having a lateral flange bent downwardly at approximately a right angle to the top, a strengthening rail lying in the angle between said top and said flange and secured thereto, said rail having a slot formed therein and extending substantially the entire length of said rail, an accessory clamp having a part adapted to be inserted in said slot at any desired point along the length of said rail, and means for retaining said clamp firmly in said slot.

18. A construction as defined in claim 17, in which said means for retaining said clamp in said slot includes a notch formed in one sidewall of said rail, and a releasable latch on said clamp adapted to be received into said notch when said clamp is to be retained on said rail.

References Cited

UNITED STATES PATENTS

| 321,887 | 7/1885 | Cross | 248—295 |
| 2,681,839 | 6/1954 | Limbach | 269—322 |
| 2,749,196 | 6/1956 | Wolfe | 248—287 |
| 2,859,710 | 11/1958 | Elsner | 248—298 |
| 2,895,775 | 7/1959 | McDonald | 269—325 |

FOREIGN PATENTS

| 20,309 | 10/1899 | Switzerland. |

HAROLD D. WHITEHEAD, *Primary Examiner.*